United States Patent Office 3,547,696
Patented Dec. 15, 1970

3,547,696
ISOTHERMAL CRYSTALLIZATION
OF DEXTROSE
Helmut Mueller, 36 Metzerstrasse,
71 Heilbronn, Germany
No Drawing. Filed Nov. 6, 1967, Ser. No. 680,951
Claims priority, application Germany, Nov. 5, 1966,
D 51,478
Int. Cl. C13f 1/02, 1/06; C13k 1/10
U.S. Cl. 127—60                                    4 Claims

ABSTRACT OF THE DISCLOSURE

Process for producing dextrose hydrate by isothermal crystallization which takes place in two stages, the first stage comprising controlled formation of seed crystals and the second stage comprising crystal growth.

---

The present invention relates to the production of crystalline dextrose hydrate. In general, it concerns an isothermal crystallization process for preparing dextrose hydrate. More particularly it concerns a crystallization process that takes place isothermally in two stages, the first stage comprising controlled formation of seed crystals and the second stage comprising crystal growth.

In the conventional process for producing dextrose hydrate by crystallization, 20 to 30 percent of the massecuite from a previous crystallization is used in the form of a mass of crystals in each succeeding crystallization. A crystallizer is rapidly filled with dextrose liquor. The temperature of the dextrose liquor is from 40 to 60° C., that of the mixture of dextrose liquor and crystals from the previous crystallization is 35 to 55° C., and the temperature of the massecuite at the completion of crystallization is 20 to 35° C. The mixture is kept at the temperature of mixing until part of the dextrose has crystallized and the initially very high supersaturation is reduced. The massecuite is subsequently cooled in the crystallizer to the centrifuging temperature with concomitant further crystallization of dextrose. This conventional crystallization process is accordingly performed as one batch operation, in one vessel, and at a continuously decreasing temperature.

Even with thorough mixing of the dextrose liquor and the mass of crystals, the supersaturation is so high at the beginning of crystallization that the formation of minute new crystals occurs in addition to the continued growth of the crystals already present. These minute new crystals are often produced in such a great number that there is not sufficient D-glucose in solution in the dextrose liquor available to continue the growth of the dextrose crystals to the desired size until the completion of the crystallization. The massecuite thus consists of crystals of widely differing size and is therefore often very difficult to centrifuge. Large crystals facilitate centrifuging because the apparent viscosity of the massecuite containing large crystals is lower than that of a massecuite consisting only of minute crystals or of crystals of widely differing size. The larger the crystals are the smaller is their surface per unit of weight. Less wash water is required to wash away the mother liquor, which reduces yield losses caused by dissolution of the crystals during centrifuging.

The conventional processes for the crystallization of dextrose hydrate do not permit the control of the crystallization in a manner to permit the formation at one time of a definite number of crystals of uniform size.

The present invention overcomes these disadvantages. The process of the invention is characterized by the feature that the crystallization takes place isothermally in two stages, the first stage comprising conrolled formation of seed crystals and the second stage comprising crystal growth.

Practice of the present invention with control of crystallization to form the largest possible crystals will result in a product of higher purity than will be obtained under otherwise identical conditions and with the same yield of crystals. Crystals of uniform size can be obtained by using a predetermined amount of seed crystals and maintaining optimal supersaturation during the crystallization process so that only seed crystals continue to grow and the spontaneous and uncontrolled formation of new crystals does not occur. The fewer the crystals used, the bigger are the crystals in the final product.

In the following discussion, the two stages of the process of the invention are explained in more detail.

FORMATION OF SEED CRYSTALS

Seed crystals are obtained by bringing a supersaturated D-glucose solution, e.g. a dextrose liquor having a dry substance content of from 60 to 85 percent, to spontaneous crystallization at a constant temperature in the range of from 20 to 55° C. The crystallization can be initiated by seeding with dextrose hydrate crystals or with a massecuite containing dextrose hydrate crystals. Long crystal flakes are initially formed which look like needles under the microscope. If the mass of initial crystals is stirred, the crystals grow within 10 to 20 hours into hexagonal crystals which are almost as wide as they are long.

Continuation of crystallization at this point until equilibrium is reached would result in the formation of a mass of crystals too thick to be handled. In accordance with the present invention dextrose liquor is added continuously to avoid such thickening. The rate of addition is a function of the rate of crystallization. Supersaturation of the mother liquor of the mass of crystals ought to be high enough to permit continued growth of the crystals spontaneously formed at the beginning of the process but not so high to initiate formation of new crystals. When the seed crystals have reached a length of 0.03 to 0.1 millimeter, the mass is ready for the second stage of the process, the crystal growth.

The isothermal formation of the seed crystals is preferably carried out at the temperature to be used in the subsequent stage of crystal growth. The formation of the seed crystals is conveniently carried out in a separate vessel. While the seed crystals may be formed in the crystallizer itself, the small volumes of dextrose liquor, generally 0.5 to 3 percent with respect to the volume of the crystallizer, are difficult to handle. Moreover, this procedure has the disadvantage that the crystallizer stands almost empty while the seed crystals are forming, i.e. for from 15 to 24 hours. Therefore, throughput capacity, with respect to available crystalization facility, is greater if the seed crystals are formed in a separate vessel and the crystallizers wherein the crystal growth takes place are charged with the optimal amount of seed crystal formed in the separate vessel.

CRYSTAL GROWTH

At this stage of the process the seed crystals should continue to grow but no new crystals should be formed.

The amount of seed crystals used, is, by volume, from 3 to 15 percent of the volume of the massecuite after adding the total amount of dextrose liquor. The actual amount to be used depends upon the size of the crystals desired in the final product. The crystallizers are filled continuously with dextrose liquor for a period of 10 to 24 hours. The temperature of the massecuite is kept constant within the range of 20 to 55° C. during the addition. The dextrose liquor must be cooled for this purpose to the crystallization temperature and the heat evolved during crystallization is removed by means of a cooling jacket which surrounds the crystallizer.

The rate of addition of the dextrose liquor is adjusted so that the optimal saturation of the mother liquor is maintained constant. The supersaturation must be high in order to maintain a high rate of crystallization. However, it may not exceed a predetermined value lest uncontrolled spontaneous formation of new crystals set in.

Care must be taken during crystallization to provide for a rapid exchange of material between the crystal surface and the supersaturated mother liquor by thorough mixing. The agitator elements must be shaped so as to permit intimate mixing without destruction of the crystal granules. It is sufficient to determine the dry substance content of the mother liquor refractometrically in order to control supersaturation during the process. This can be done without the necessity of a preliminary separation of the crystals.

The massecuite is stirred at constant temperature after the total amount of dextrose liquor is added until supersaturation is completely eliminated. The amount of time required to do this depends upon the size of the crystals and varies between 10 and 24 hours. If isothermal crystallization is carried out, for instance, at 30° C., 50 to 60 percent of the D-glucose contained in the dextrose liquor can be crystallized. The mother liquor which results can be used for a second crystallization.

The yield from the isothermal crystallization can be adapted to commercial plant requirements by varying the dextrose liquor concentration or the crystallization temperature.

If a maximum yield is desired from the first crop, the temperature of the massecuite can be lowered after the isothermal stage of crystallization and more dextrose may crystallize. The cooling rate must be selected to avoid a supersaturation high enough to lead to formation of small crystals. Supersaturation must be reduced isothermally after the final temperature is attained. Crystalline dextrose hydrate is then recovered by centrifuging. The mother liquor may be concentrated and fed to a second crystallization process which is conducted analogously.

The new two-stage process for producing dextrose hydrate by crystallization offers several advantages over the techniques known in the prior art.

Only as many seed crystals are used in the crystallization process as are necessary to obtain the desired crystal size in the final product. The crystallizers are emptied after each cycle and the massecuite centrifuged, which increases the throughput capacity. Furthermore, a possible bacterial inoculation of the succeeding batch by recycle of the crystal mass is avoided. Also, an optimal supersaturation can be maintained in the crystal growth stage by controlling the rate of addition of the dextrose liquor whereby the undesired formation of small crystals is prevented. The massecuite contains crystals of uniform size. The size may be controlled by varying the amount of seed crystals. The uniform crystal size facilitates centrifuging. Difficulties normally encountered in temperature control are avoided since the crystal growth takes place isothermally. But care must be taken to remove the heat of crystallization. The temperature difference between the cooling jacket and the massecuite is negligible and this prevents deposit of crystals on the cooling surfaces.

The process of the invention can be adapted to commercial plant requirements by modifying the crystallization temperature and the concentration of the dextrose liquor. If very high yields of crystals are required from the first crop, the isothermal process may be combined with a temperature-controlled process.

EXAMPLE 1

Isothermal formation of seed crystals using massecuite 80 percent by volume of dextrose liquor having a dry substance content of about 70 percent and containing about 88 percent D-glucose on a dry substance basis are added with agitation to 20 percent by volume of dextrose hydrate crystals over a short period of time and at a temperature of 30° C. During the addition, the heavy liquor is cooled to the temperature of the massecuite (30° C). Small needle-shaped crystals will have formed within 2 to 5 hours. These crystals grow within another 15 to 20 hours into hexagonal crystal flakes which are almost as wide as they are long. They have a length of 0.02 to 0.08 millimeter. These crystals are perfectly suited as to seed crystals.

Isothermal formation of seed crystals using crystal nuclei

Part of the dextrose liquor having a dry substance content of about 70 percent and containing about 88 percent D-glucose on a dry substance basis is seeded with agitation with 0.05 to 0.1 percent powdery dextrose. Small needle-shaped crystals will have formed within 3 to 5 hours. If the refractometrically determined dry substance content in the mother liquor of the crystal mass is equivalent to 61–64° Brix, further dextrose liquor is added continuously. The rate of addition is adjusted so that a value of 63–64° Brix is not exceeded for the mother liquor in order to avoid danger of forming new small crystals. After addition of another four parts of dextrose liquor, the needle-shaped crystals have grown to hexagonal flakes which are almost as wide as they are long. Their length is 0.02 to 0.08 millimeter. These crystals are perfectly well suited for the second stage of the process, crystal growth.

EXAMPLE 2

Isothermal crystallization 20 liters of seed crystals produced according to Example 1 using crystal nuclei are charged to a crystallizer and mixed with 16 liters of dextrose liquor (70 percent dry substance, 88 percent D-glucose on a dry substance basis) with agitation. Over a period of about 20 hours another 264 liters of dextrose liquor cooled to 30° C. are added with agitation. The rate of addition is adjusted so that the dry substance content of the mother liquor does not exceed 63–64° Brix. After the total amount of dextrose liquor is added, agitation of the massecuite is continued for about 24 hours at 30° C.

During this time the supersaturation is reduced from about 1.15 to 1.0. When crystallization is complete, the dry substance content of the mother liquor is about 58° Brix, equaling about 59 percent dry substance. The results are shown below.

|  | Kg. | Percent D-glucose | Kg. D-glucose | Percent D-glucose used |
| --- | --- | --- | --- | --- |
| Dextrose liquor | 400.0 | 67.8 | 271.5 | 100.0 |
| Crystalline dextrose hydrate | 140.7 | 100.0 | 140.7 | 51.8 |
| Mother liquor | 231.5 | 49.0 | 113.3 | 41.8 |
| Wash water | 43.0 | 40.7 | 17.5 | 6.4 |

EXAMPLE 3

Isothermal crystallization with subsequent temperature reduction

Isothermal crystallization is conducted in accordance with Example 2. The massecuite is then cooled with agitation to 20° C. and the supersaturation is reduced over another 10 hour period. The results are shown below.

| | Kg. | Percent D-glucose | Kg. D-glucose | Percent D-glucose used |
|---|---|---|---|---|
| Dextrose liquor | 400.0 | 67.8 | 271.5 | 100.0 |
| Crystalline dextrose hydrate | 167.0 | 100.0 | 167.0 | 61.5 |
| Mother liquor | 206.0 | 42.4 | 87.4 | 32.2 |
| Wash water | 48.5 | 35.3 | 17.1 | 6.3 |

D-glucose values are given in terms of D-glucose hydrate.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A process for crystallizing dextrose liquor into crystalline dextrose hydrate comprising
    (a) forming a predetermined number of seed crystals of dextrose hydrate by supersaturating a dextrose liquor maintained at a constant temperature,
    (b) adding, to a crystallizer maintained at a constant temperature and containing said seed crystals, dextrose liquor which is at substantially the same temperature to form a supersaturated massecuite,
    (c) intimately mixing said massecuite while adding, at the same constant crystallizer temperature, a predetermined amount of dextrose liquor at a rate controlled to maintain the massecuite at a level of supersaturation which causes said seed crystals to grow while preventing any substantial nucleation,
    (d) continuing said intimate mixing, isothermally, until the supersaturation of the massecuite is substantially eliminated,
    (e) centrifuging the massecuite from step (d) and
    (f) recovering dextrose hydrate crystals of substantially uniform size.

2. A process as defined by claim 1 wherein a single constant temperature in the range of about 20° C. to about 55° C. is employed throughout the entire process.

3. A process as defined by claim 1 wherein step (a) and step (b) are performed in separate vessels.

4. A process as defined by claim 1 wherein step (d) the supersaturation of the massecuite is reduced from about 1.15 to about 1.0.

References Cited
UNITED STATES PATENTS

| | | | |
|---|---|---|---|
| 1,471,347 | 10/1923 | Newkirk | 127—30 |
| 1,521,830 | 1/1925 | Newkirk | 127—30 |
| 1,640,717 | 8/1927 | Newkirk | 127—60 |
| 1,708,940 | 4/1929 | Daly | 127—58 |
| 1,954,584 | 4/1934 | Copland et al. | 127—58 |
| 1,976,361 | 10/1934 | Newkirk | 127—30X |
| 2,029,560 | 2/1936 | Copland | 127—58 |

MORRIS O. WOLK, Primary Examiner

D. G. CONLIN, Assistant Examiner

U.S. Cl. X.R.

127—30, 58

UNITED STATES PATENT OFFICE
CERTIFICATE OF CORRECTION

Patent No. 3,547,696    Dated December 15, 1970

Inventor(s)  Helmut Mueller

It is certified that error appears in the above-identified patent and that said Letters Patent are hereby corrected as shown below:

In the heading to the printed specification, after line insert -- CPC International Inc., a corporation of Delaware Column 2, line 2, "conrolled" should read -- controlled --

Signed and sealed this 11th day of May 1971.

(SEAL)
Attest:

EDWARD M. FLETCHER, JR.
Attesting Officer

WILLIAM E. SCHUYLER, JR.
Commissioner of Patents